United States Patent
Ohuchi et al.

(10) Patent No.: US 7,107,843 B2
(45) Date of Patent: Sep. 19, 2006

(54) ANGULAR VELOCITY SENSOR

(75) Inventors: Satoshi Ohuchi, Hyogo (JP); Keisuke Kuroda, Osaka (JP); Takeshi Yamamoto, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/541,322

(22) PCT Filed: Jan. 7, 2005

(86) PCT No.: PCT/JP2005/000108

§ 371 (c)(1),
(2), (4) Date: Jun. 30, 2005

(87) PCT Pub. No.: WO2005/068937

PCT Pub. Date: Jul. 28, 2005

(65) Prior Publication Data

US 2006/0117851 A1 Jun. 8, 2006

(30) Foreign Application Priority Data

Jan. 13, 2004 (JP) ............................. 2004-005267

(51) Int. Cl.
*G01P 9/04* (2006.01)
*G01P 19/56* (2006.01)

(52) U.S. Cl. ................................ 73/504.16; 73/504.12

(58) Field of Classification Search ............ 73/504.16, 73/504.12, 504.04; 310/329, 370, 316, 317, 310/357–360
See application file for complete search history.

(56) References Cited

U.S. PATENT DOCUMENTS

| | | | | |
|---|---|---|---|---|
| 5,719,460 A | * | 2/1998 | Watarai et al. | 310/316.01 |
| 6,412,347 B1 | * | 7/2002 | Kuroda et al. | 73/504.16 |
| 6,418,790 B1 | * | 7/2002 | Yukawa et al. | 73/504.12 |
| 6,584,841 B1 | * | 7/2003 | Ichinose et al. | 73/504.12 |
| 6,666,090 B1 | * | 12/2003 | Mori et al. | 73/504.02 |
| 6,705,151 B1 | * | 3/2004 | Nozoe et al. | 73/1.37 |
| 6,865,945 B1 | * | 3/2005 | Hayashi et al. | 73/504.16 |

FOREIGN PATENT DOCUMENTS

| | | |
|---|---|---|
| JP | 09-236436 | 9/1997 |
| JP | 2000-088584 | 3/2000 |
| JP | 2001-221637 A | 8/2001 |
| JP | 2002-139322 A | 5/2002 |

* cited by examiner

*Primary Examiner*—Helen Kwok
(74) *Attorney, Agent, or Firm*—McDermott Will & Emery LLP

(57) ABSTRACT

The present invention provides an angular velocity sensor that can diagnose abnormalities without having on a tuning fork vibrator special abnormality diagnostic signal input electrodes or reference potential ground electrodes to reduce errors in detecting angular velocity. Switches (45) and (48) are used to generate drive signals of the same phase at output terminals (49) and (50), thereby bending arms (2) and (3) in the Z-axis direction of tuning fork vibrator 1. The electric charges generated from tenth electrode (22) and 12th electrode (25) formed respectively on arms (2) and (3) are amplified respectively at first amplifier (62) and second amplifier (63). The outputs of these amplifiers are inputted to differential amplifier (64), whose output is compared by comparator (81) with a prescribed value generated by reference value generator (82). When the output exceeds the prescribed value, comparator (81) determines an abnormality.

7 Claims, 4 Drawing Sheets

Surface X2

Surface Y1

Surface X1

Surface Y2

ANGULAR VELOCITY SENSOR

TECHNICAL FIELD

The present invention relates to an angular velocity sensor provided with the function of detecting abnormalities.

Background Art

One such conventional angular velocity sensor is disclosed in Japanese Patent Unexamined Publication No. 2000-88584. FIGS. 4B, 4C, 4A and 4D are developed views of the vibrator shown in this patent document when the electrodes formed on the outer surfaces of the vibrator are seen from the front, back, left side and right side of the vibrator. As shown in these drawings, tuning fork vibrator 100 made of piezoelectric ceramics has drive electrodes 101 and 102 on surface X1, which is a main surface of the vibrator and is provided with two arm portions, and also has angular velocity detection electrodes 103 and 104 respectively on surfaces Y1 and Y2, which are the side surfaces of the vibrator. Tuning fork vibrator 100 further has abnormality diagnostic signal input electrodes 105 and 106 near the inner ends of the two arm portions on surface X1, and also has reference potential ground electrodes 107 and 108 on surface X1.

In this angular velocity sensor, abnormalities are diagnosed by inputting abnormality diagnostic signals to abnormality diagnostic signal input electrodes 105 and 106 and by capacitively coupling these signals between angular velocity detection electrodes 103 and 104. In addition, the reference potential ground electrodes are specially provided on surface X1 of tuning fork vibrator 100 in order to reduce errors in detecting angular velocity when abnormality diagnostic signals are inputted to abnormality diagnostic signal input electrodes 105 and 106.

Thus, in order to diagnose abnormalities and to reduce errors in detecting angular velocity, the conventional angular velocity sensor must be provided with abnormality diagnostic signal input electrodes 105 and 106, and reference potential ground electrodes 107 and 108 on surface X1 of tuning fork vibrator 100.

The present invention has an object of providing an angular velocity sensor that can diagnose abnormalities without having on a tuning fork vibrator special abnormality diagnostic signal input electrodes or reference potential ground electrodes to reduce errors in detecting angular velocity.

SUMMARY OF THE INVENTION

In order to achieve this object, the angular velocity sensor of the present invention includes a tuning fork vibrator including at least two arms, and a base to connect the at least two arms. The angular velocity sensor further includes a drive unit which is provided on a main surface of an arm of the at least two arms of the tuning fork vibrator so as to excite the tuning fork vibrator in one of an X direction and a Z direction of the tuning fork vibrator. The angular velocity sensor further includes a detection unit which is provided on the main surface of the arm of the at least two arms of the tuning fork vibrator so as to detect bending of the tuning fork vibrator vibrating in the Z direction in response to incoming angular velocity. The angular velocity sensor further includes a first drive circuit which makes the drive unit excite the tuning fork vibrator in the X direction, a detection circuit which includes an amplifier for amplifying a signal from the detection unit and producing an angular velocity signal, and a second drive circuit which applies a drive signal to the drive unit so as to make the drive unit excite the tuning fork vibrator in the Z direction.

The angular velocity sensor further includes a self-diagnostic circuit which compares an output of the amplifier with a reference value when the second drive circuit applies the drive signal to the drive unit, and which determines to be abnormal when a prescribed value cannot be obtained. This makes it possible to diagnose abnormalities without providing on the tuning fork vibrator special abnormality diagnostic signal input electrodes or reference potential ground electrodes to reduce errors in detecting angular velocity.

The angular velocity sensor of the present invention may have a structure where at turn-on, the second drive circuit is first activated so that the self-diagnostic circuit can perform self diagnosis, and after a mode transition occurs, the first drive circuit is activated so that detection of angular velocity can be performed in a predetermined manner. The angular velocity sensor may have another structure where after the first drive circuit is activated and detection of angular velocity is continued for a prescribed length of time, the second drive circuit is activated so that the self-diagnostic circuit can perform self diagnosis, and then, the first drive circuit is activated again so that the detection of angular velocity can be performed again. The angular velocity sensor may have further another structure where the second drive circuit is activated when it is detected that a car is at a speed of zero, and the self-diagnostic circuit performs self diagnosis. These structures allow the diagnosis of abnormalities of the angular velocity sensor at a desired timing.

In the angular velocity sensor of the present invention, the tuning fork vibrator is made of a non-piezoelectric material, and the drive unit includes a first, second, third and fourth electrodes which are formed separately from each other inside and outside a center line on the main surface of each of the at least two arms of the tuning fork vibrator, and a first, second, third and fourth piezoelectric thin films which are respectively formed on the first, second, third and fourth electrodes. The drive unit further includes a fifth, sixth, seventh and eighth electrodes which are respectively formed on the first, second, third and fourth piezoelectric thin films. The fifth, sixth, seventh and eighth electrodes are applied with drive signals of the same phase by the second drive circuit. The detection unit includes a ninth electrode which is formed on the main surface of one of the at least two arms separately from the first and second electrodes, and a fifth piezoelectric thin film which is formed on the ninth electrode. The detection unit further includes a tenth electrode which is formed on the fifth piezoelectric thin film, and an 11th electrode which is formed on the main surface of an other of the at least two arms separately from the third and fourth electrodes. The detection unit further includes a sixth piezoelectric thin film which is formed on the 11th electrode, and a 12th electrode which is formed on the sixth piezoelectric thin film. The self-diagnostic circuit includes a first amplifier which is connected with the tenth electrode, a second amplifier which is connected with the 12th electrode, a differential amplifier which differentially amplifies an output of the first amplifier and an output of the second amplifier, and a comparator which compares an output of the differential amplifier with a reference value. It is possible to form both the drive unit and the detection unit on the same surface of the tuning form vibrator, and it becomes also possible to self-diagnose unbalance and other problems resulting from the disconnection of a wire or the like in the detection system or from deterioration in the detection unit.

In the angular velocity sensor of the present invention, the tuning fork vibrator is made of a non-piezoelectric material, and the drive unit includes a first, second, third and fourth electrodes which are formed separately from each other inside and outside a center line on the main surface of each of the at least two arms of the tuning fork vibrator, and a first, second, third and fourth piezoelectric thin films which are respectively formed on the first, second, third and fourth electrodes. The drive unit further includes a fifth, sixth, seventh and eighth electrodes which are respectively formed on the first, second, third and fourth piezoelectric thin films. The fifth, sixth, seventh and eighth electrodes are applied with drive signals of the same phase by the second drive circuit. The detection unit includes a ninth electrode which is formed on the main surface of one of the at least two arms separately from the first and second electrodes, a fifth piezoelectric thin film which is formed on the ninth electrode, and a tenth electrode which is formed on the fifth piezoelectric thin film. The detection unit further includes an 11th electrode which is formed on the main surface of an other of the at least two arms separately from the third and fourth electrodes, a sixth piezoelectric thin film which is formed on the 11th electrode, and a 12th electrode which is formed on the sixth piezoelectric thin film. The self-diagnostic circuit includes a first amplifier which is connected with the tenth electrode, a second amplifier which is connected with the 12th electrode, a first comparator which compares an output of the first amplifier with a reference value, and a second comparator which compares an output of the second amplifier with a reference value. This structure allows the diagnosis of abnormalities in each detection unit.

The angular velocity sensor of the present invention further includes a differential amplifier which receives the output of the first amplifier and the output of the second amplifier, and a comparator which compares an output of the differential amplifier with a reference value. This structure allows not only the diagnosis of abnormalities in each detection unit, but also the self diagnosis of unbalance resulting from the disconnection of a wire or the like in the detection system or from deterioration in the detection unit.

The angular velocity sensor of the present invention includes a tuning fork vibrator including at least two arms, and a base to connect the at least two arms, and a drive unit which is provided on a main surface of an arm of the at least two arms of the tuning fork vibrator so as to excite the tuning fork vibrator in one of an X direction and a Z direction of the tuning fork vibrator. The angular velocity sensor further includes a detection unit which is provided on the main surface of the arm of the at least two arms of the tuning fork vibrator so as to detect bending of the tuning fork vibrator vibrating in the Z direction in response to incoming angular velocity, a first drive circuit which makes the drive unit excite the tuning fork vibrator in the X direction, and a detection circuit which includes an amplifier for amplifying a signal from the detection unit and producing an angular velocity signal. The angular velocity sensor further includes a second drive circuit which applies a drive signal to the drive unit so as to make the drive unit excite the tuning fork vibrator in the Z direction, and a self-diagnostic circuit which compares an output of the amplifier with a reference value when the second drive circuit applies the drive signal to the drive unit, and which determines to be abnormal when a prescribed value cannot be obtained. This structure allows the diagnosis of abnormalities without providing on the tuning fork vibrator special abnormality diagnostic signal input electrodes or reference potential ground electrodes to reduce errors in detecting angular velocity.

Figure 1:
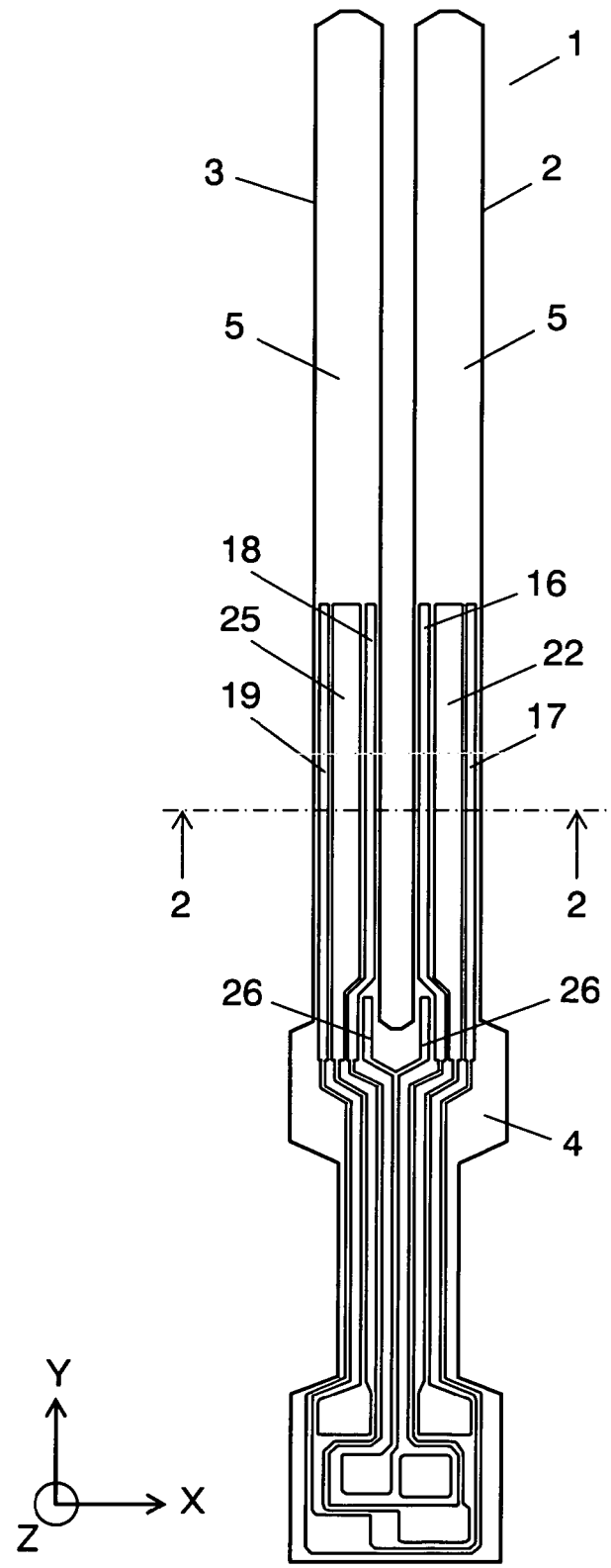
FIG. 1 is a block diagram of a tuning fork vibrator of an angular velocity sensor according to an embodiment of the present invention.

REFERENCE NUMERALS IN THE DRAWINGS 1 tuning fork vibrator
2, 3 arm
4 base
5 main surface
6, 7 center line
8 first electrode
9 second electrode
10 third electrode
11 fourth electrode
12 first piezoelectric thin film
13 second piezoelectric thin film
14 third piezoelectric thin film
15 fourth piezoelectric thin film
16 fifth electrode
17 sixth electrode
18 seventh electrode
19 eighth electrode
20 ninth electrode
23 11th electrode
21 fifth piezoelectric thin film
24 sixth piezoelectric thin film
22 tenth electrode
25 12th electrode
26 monitoring electrode
40 connection terminal
41 amplifier
42 AGC circuit
43, 44 bandpass filter
45, 48 switch
46 output amplifier
47 inverting amplifier
49, 50 output terminal
51 first drive circuit
52 second drive circuit
60, 61 input terminal
62 first amplifier
63 second amplifier
64 differential amplifier
65 phase shifter
66 synchronous detector
67 low pass filter 68 angular velocity signal/self-diagnostic signal output terminal
69 angular velocity detection circuit
80, 83, 84 full-wave rectifier
81 comparator
82, 87, 88 reference value generator
85 first comparator
86 second comparator
89 first self-diagnostic signal output terminal
90 second self-diagnostic signal output terminal
91 self-diagnostic signal output terminal

DETAILED DESCRIPTION OF PREFERRED EMBODIMENT

An embodiment of the present invention will be described as follows with reference to the drawings.

Exemplary Embodiment

Figure 2:
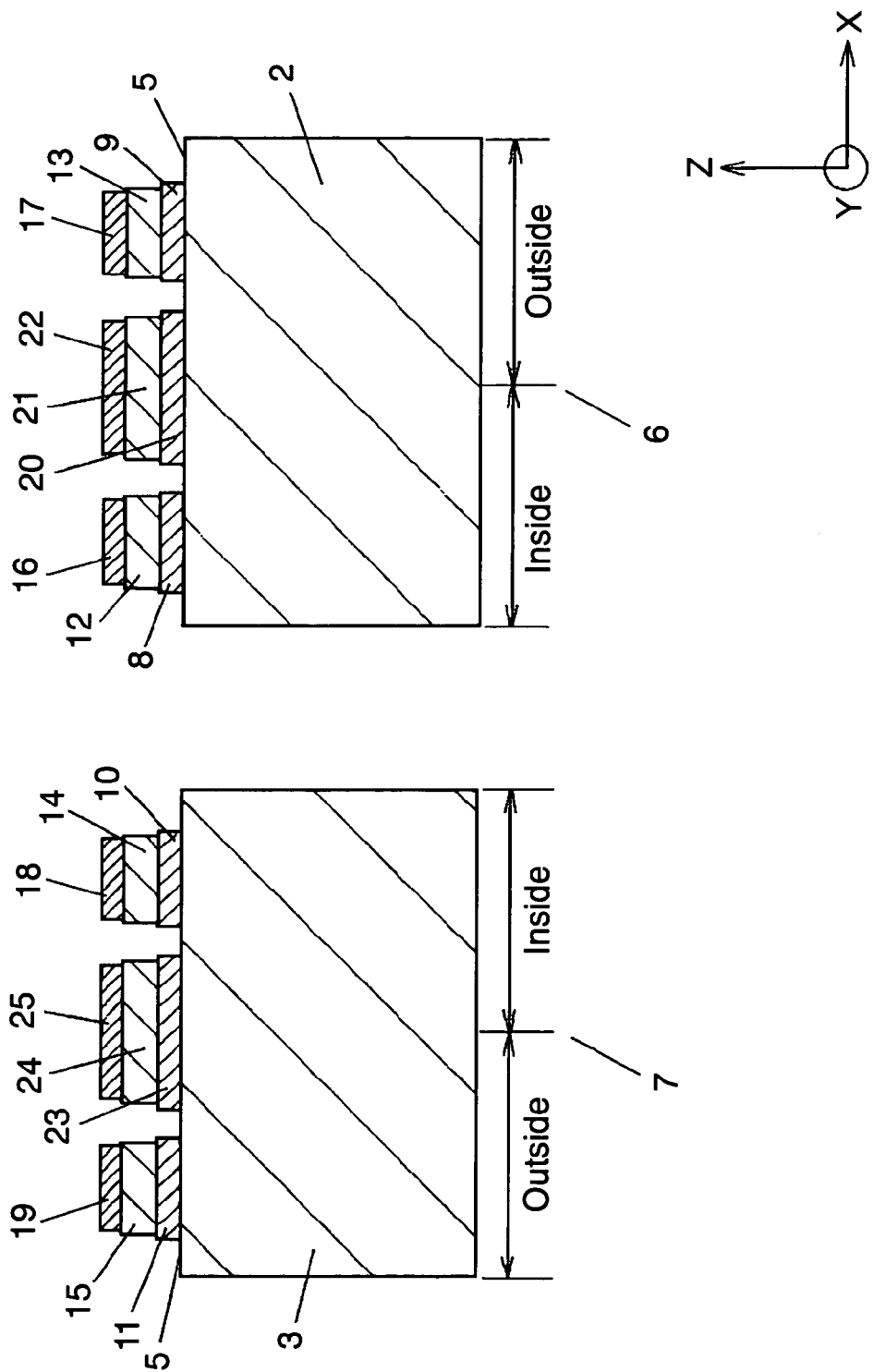
FIG. 2 is a cross sectional view of the vibrator of the embodiment of the present invention taken along line 2—2 shown in FIG. 1.
Figure 3:
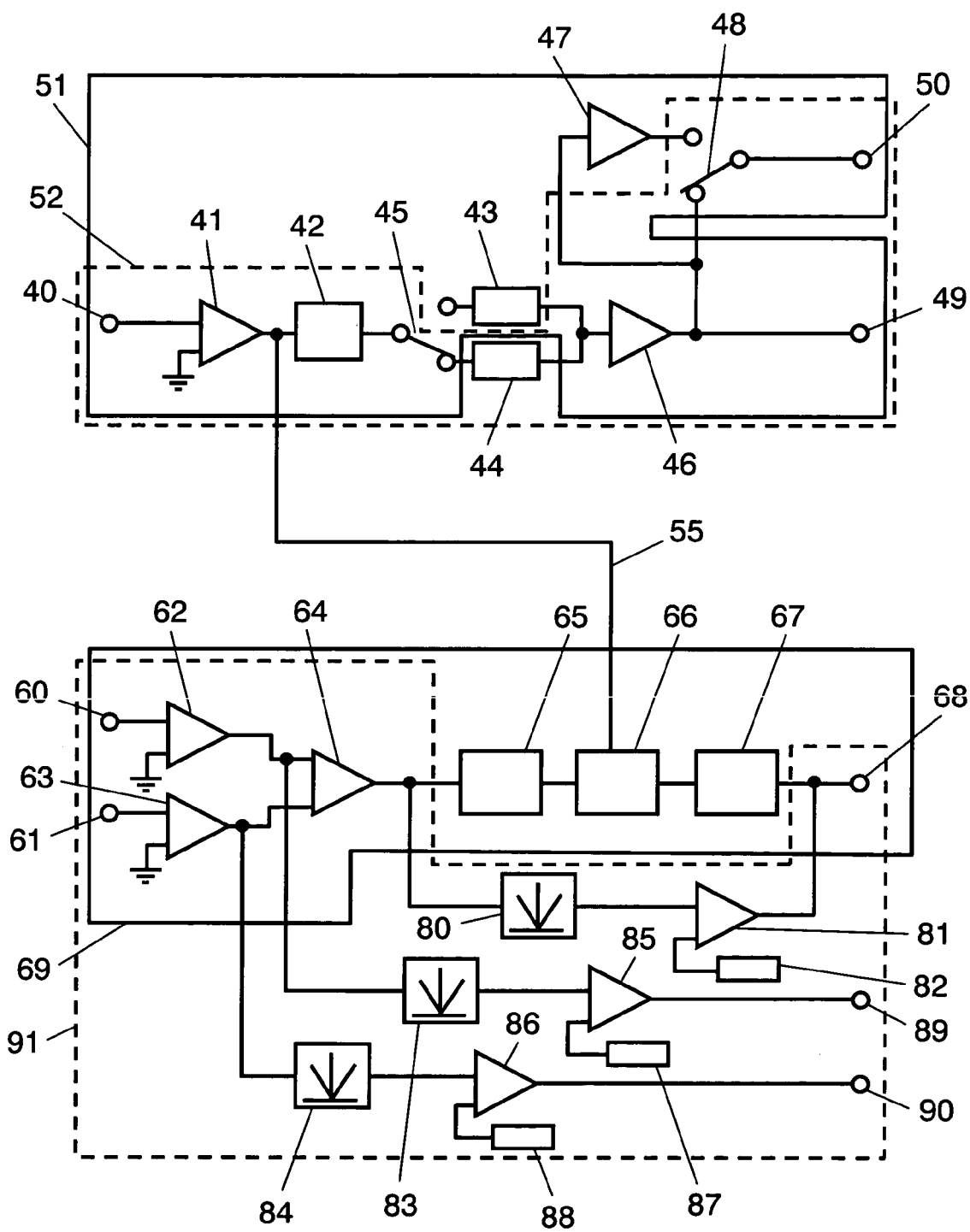
FIG. 3 is a circuit block diagram of the angular velocity sensor according to the embodiment of the present invention.
Figure 4B:
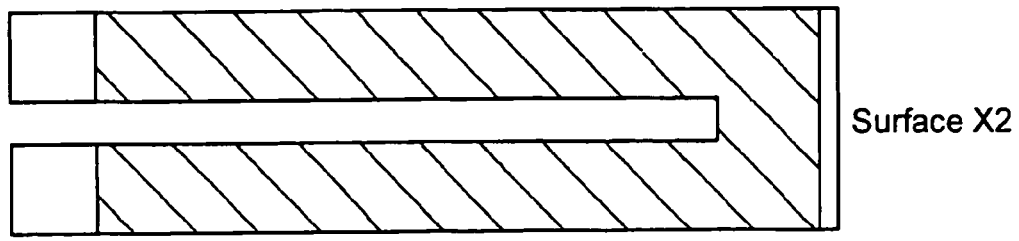
FIG. 4B is a developed view showing an electrode structure on surface X2 of the vibrator of the conventional angular velocity sensor.
Figure 4C:
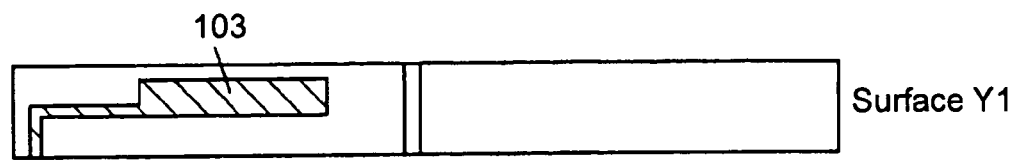
FIG. 4C is a developed view showing an electrode structure on surface Y1 of the vibrator of the conventional angular velocity sensor.
Figure 4A:
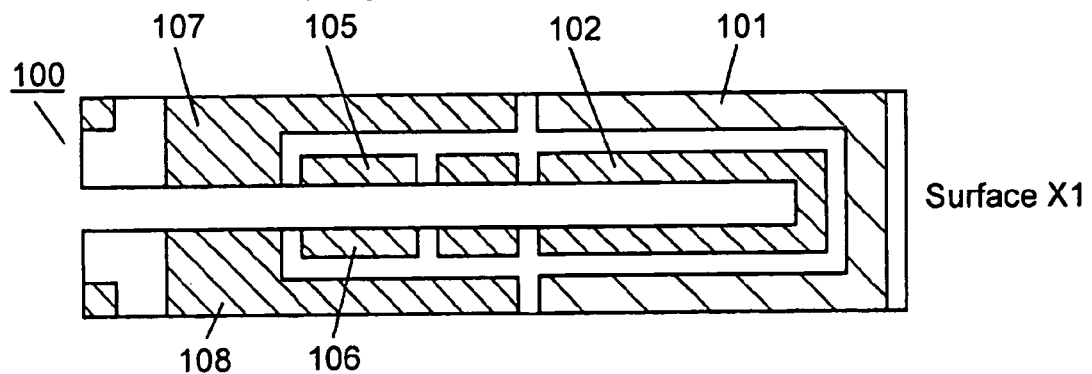
FIG. 4A is a developed view showing an electrode structure on surface X1 of the vibrator of a conventional angular velocity sensor.
Figure 4D:
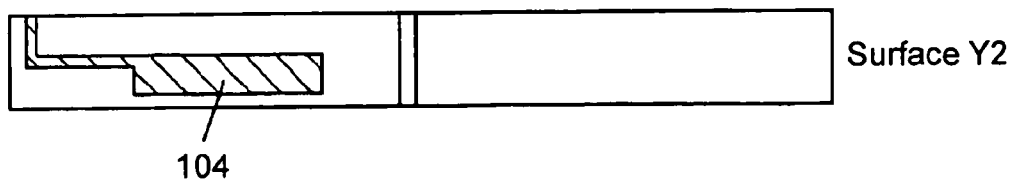
FIG. 4D is a developed view showing an electrode structure on surface Y2 of the vibrator of the conventional angular velocity sensor.

FIG. 1 is a block diagram of a tuning fork vibrator of an angular velocity sensor according to an embodiment of the present invention. FIG. 2 is a cross sectional view of the vibrator shown in FIG. 1 which is taken along line 2—2, and FIG. 3 is a block diagram of an angular velocity sensor circuit according to the embodiment.

In FIGS. 1 and 2, tuning fork vibrator 1, which is made of silicon that is a non-piezoelectric material, includes arms 2 and 3, and base 4. Each of arms 2 and 3 has main surface 5.

When FIG. 2 is viewed from the front, arm 2 is on the right side and arm 3 is on the left side.

On arm 2, center line 6 indicates the approximate center of arm 2. In a position on main surface 5 that is inside center line 6 or closest to arm 3, first electrode 8 is formed as a common electrode. On first electrode 8, first piezoelectric thin film 12 is formed. On piezoelectric thin film 12, fifth electrode 16 is formed as a drive electrode. Electrode 16 can be made of, e.g., Au/Ti.

In a position on main surface 5 that is outside center line 6, or rightmost when FIG. 2 is viewed from the front, second electrode 9 is formed as a common electrode. On second electrode 9, second piezoelectric thin film 13 is formed. On second piezoelectric thin film 13, sixth electrode 17 is formed as a drive electrode. In a position on main surface 5 that is above center line 6 of arm 2, ninth electrode 20 is formed as a common electrode. On electrode 20, fifth piezoelectric thin film 21 and tenth electrode 22 as a detection electrode are formed in this order.

On the other hand, on arm 3 on the left side, center line 7 indicates the approximate center of arm 3.

In a position on main surface 5 that is inside center line 7 or closest to arm 2, third electrode 10 is formed as a common electrode. On third electrode 10, third piezoelectric film 14 and seventh electrode 18 are formed in this order. In a position on main surface 5 that is outside center line 7, or leftmost when FIG. 2 is viewed from the front, fourth electrode 11 is formed as a common electrode. On electrode 11, fourth piezoelectric thin film 15 and eight electrode 19 are formed in this order. In addition, in a position on main surface 5 that is above center line 7 of arm 3, 11th electrode 23 is formed. On electrode 23, sixth piezoelectric thin film 24 and 12th electrode 25 are formed in this order.

Here, first to sixth piezoelectric thin films 12, 13, 14, 15, 21 and 24 are subjected to a poling process in the direction perpendicular to the film surface made of PZT.

The reference numerals 26 shown in FIG. 1 indicate monitoring electrodes formed on main surfaces 5 of arms 2 and 3.

Monitoring electrodes 26 monitor the drive status of tuning fork vibrator 1, and the magnitudes of charges generated in monitoring electrodes 26 are controlled to be constant by AGC circuit 42, which will be described later.

When FIG. 3 is viewed from the front, the top side has first drive circuit 51 and second drive circuit 52. First drive circuit 51 includes connection terminal 40, amplifier 41, AGC circuit 42, switch 45, bandpass filter 43, output amplifier 46, inverting amplifier 47, switch 48, output terminal 49 and output terminal 50.

On the other hand, second drive circuit 52 includes connection terminal 40, amplifier 41, AGC circuit 42, switch 45, bandpass filter 44, output amplifier 46, switch 48, output terminal 49 and output terminal 50.

As apparent from the aforementioned components, first drive circuit 51 and second drive circuit 52 share most of their components. More specifically, first drive circuit 51 does not include bandpass filter 44, which is a component of second drive circuit 52, but shares the other components with second drive circuit 52. On the other hand, second drive circuit does not include bandpass filter 43 and inverting amplifier 47, which are components of first drive circuit, but shares the other components with first drive circuit 51.

In the first and second drive circuits, connection terminal 40 receives signals from monitoring electrodes 26. Amplifier 41 receives the monitor signals from monitoring electrodes 26 via connection terminal 40, and amplifies them. The monitor signals outputted from monitoring electrodes 26 can be sinusoidal waves of frequency f=22 KHz.

Amplifier 41 is connected with AGC circuit 42, which controls monitor signals to have gains with a specified size. AGC circuit 42 is connected with bandpass filter 43, which excites tuning fork vibrator 1 at frequency f=22 kHz in the direction X of tuning fork vibrator 1. AGC circuit 42 is also connected with bandpass filter 44, which excites tuning fork vibrator at frequency f=12 kHz in the direction Z of tuning fork vibrator 1 to perform self diagnosis. Switch 45 allows the output of AGC circuit 42 to be inputted to either bandpass filter 43 or bandpass filter 44. The output signal of bandpass filter 43 or bandpass filter 44 is inputted to output amplifier 46. Output amplifier 46 amplifies the output (monitor) signal, which then excites tuning fork vibrator 1. Output amplifier 46 is connected with inverting amplifier 47. Switch 48 allows the output signal of either output amplifier 46 or inverting amplifier 47 to be outputted to output terminal 50. Output amplifier 46 is also connected with output terminal 49, which is connected with fifth electrode 16 and seventh electrode 18.

Output terminal 50 outputs the output signal of either output amplifier 46 or inverting amplifier 47 via switch 48, and is also connected with sixth electrode 17 and eighth electrode 19.

When FIG. 3 is viewed from the front, the bottom side has angular velocity detection circuit 69 and self-diagnostic circuit 91.

Angular velocity detection circuit 69 includes input terminals 60 and 61, first amplifier 62, second amplifier 63, differential amplifier 64, phase shifter 65 synchronous detector 66, low-pass filter 67 and output terminal 68. Output terminal 68 outputs velocity signals and self-diagnostic signals.

Self-diagnostic circuit 91 includes input terminals 60 and 61, first differential amplifier 62, second amplifier 63, differential amplifier 64 and full-wave rectifiers 80, 83 and 84.

Self-diagnostic circuit 91 further includes comparator 81, reference value generators 82, 87 and 88, angular velocity signal/self-diagnostic signal output terminal 68, first comparator 85, second comparator 86, first self-diagnostic signal output terminal 89 and second self-diagnostic signal output terminal 90.

As apparent from FIG. 3, first amplifier 62, second amplifier 63 and differential amplifier 64 are shared by angular velocity detection circuit 69 and self-diagnostic circuit 91.

In angular velocity detection circuit 69 and self-diagnostic circuit 91, input terminals 60 and 61 are respectively connected with tenth and 12th electrodes 22 and 25 shown in FIG. 2. A signal at input terminal 60 is inputted to first amplifier 62. A signal at input terminal 61 is inputted to second amplifier 63. First amplifier 62 and second amplifier 63 output signals to differential amplifier 64, which amplifies these signals in accordance with their amplitudes and phase differences. Differential amplifier 64 outputs a signal to phase shifter 65. Phase shifter 65 outputs a signal to synchronous detector 66. Synchronous detector 66 also receives a signal from amplifier 41, which is a component of the first and second drive circuits via bonding wire 55.

Synchronous detector 66 outputs a signal to the input side of low-pass filter 67, which outputs an angular velocity signal from its output side. The output side of low-pass filter 67 is connected with output terminal 68, which outputs an angular velocity signal/self-diagnostic signal.

The following is a description of the operation of the angular velocity sensor of the present embodiment.

When the angular velocity sensor circuit of the present embodiment shown in FIG. 3 is turned on, switch 45 connects between the output side of AGC circuit 42 and the input side of bandpass filter 44, and also switch 48 connects between the output side of output amplifier 46 and output terminal 50. As a result, output terminal 49 and output terminal 50 have drive signals with the same phase as each other. This is a status in which second drive circuit 52 is in operation. In this status, arms 2 and 3 are bent in the Z-axis direction of tuning fork vibrator 1. The bending of arms 2 and 3 in the Z-axis direction generates large electric charges from tenth electrode 22 and 12th electrode 25. The large electric charges on tenth electrode 22 and 12th electrode 25 are respectively amplified by first amplifier 62 and second amplifier 63, and are then respectively inputted to full-wave rectifiers 83 and 84. The outputs of full-wave rectifiers 83 and 84 are respectively inputted to first comparator 85 and second comparator 86.

At this moment, the values of reference value generators 87 and 88 respectively connected with first comparator 85 and second comparator 86 can be set to, e.g. 2000 mV. By doing so, the electric charges from tenth electrode 22 and 12th electrode 25 do not reach prescribed values. Or when the electric charges have values below 2000 mV because of the disconnection of a wire or the like in the detection system, the signals which have been determined to be "abnormal" respectively by first comparator 85 and second comparator 86 appear respectively at first self-diagnostic signal output terminal 89 and second self-diagnostic signal output terminal 90.

The outputs of first amplifier 62 and second amplifier 63 are also inputted to differential amplifier 64. The output of differential amplifier 64 is inputted to full-wave rectifier 80 whose output is inputted to comparator 81.

Now assume that the electric charges generated from tenth electrode 22 and 12th electrode 25 do not reach the prescribed values, or have what is called "unbalance" due to some deterioration. Such "unbalance" can be caused by the difference in piezoelectric properties between piezoelectric thin films or by the occurrence of separation or disconnection between a piezoelectric thin film and an electrode. Here, by setting the value of reference value generator 82 connected with comparator 81 to as low as 100 mV, a small "unbalance" barely exceeding 100 mV can be determined to be "abnormal". As a result, a signal which has been determined to be "abnormal" by comparator 81 appears at angular velocity signal/self-diagnostic signal output terminal 68. This is a first self-diagnostic mode.

After the aforementioned self diagnosis is performed for a given length of time, switch 45 connects between the output side of AGC circuit 42 and the input side of bandpass filter 43, and also, switch 48 connects between the output side of output amplifier 46 and the input side of inverting amplifier 47. In addition, the output side of inverting amplifier 47 is connected with output terminal 50. In other words, output terminals 49 and 50 have drive signals with opposite phases to each other. This makes arms 2 and 3 oscillate in the X-axis direction of tuning fork vibrator 1, and when an angular velocity is entered around the Y axis, the angular velocity can be detected in the usual manner based on angular velocity detection circuit 69. The angular velocity output at this moment appears at angular velocity signal/self-diagnostic signal output terminal 68.

When the aforementioned detection of angular velocity is performed in the usual manner for a given length of time, and there is another command to perform self diagnosis, switch 45 connects the output side of AGC circuit 42 and the input side of bandpass filter 44, and also, switch 48 connects the output side or output amplifier 46 and output terminal 50. As a result, output terminal 49 and output terminal 50 have drive signals with the same phase as each other. This is a status in which second drive circuit 52 is in operation.

In this status, arms 2 and 3 are bent in the Z-axis direction of tuning fork vibrator 1, and the same self diagnosis as described above is performed. This is a second self-diagnostic mode. When the self diagnosis is over, the normal mode to detect angular velocity is resumed.

In a case where the angular velocity sensor is mounted on a transportation means such as a car, when it is detected that the car is at a speed of zero, second drive circuit 52 is activated to perform self diagnosis. This is a third self-diagnostic mode. When the car starts to move again, the normal mode to detect angular velocity is resumed.

Although the present embodiment describes the first, second and third self-diagnostic modes, at least one of the self-diagnostic modes may be performed, or the three modes may be combined as necessary.

In the above description of the present embodiment, the output of comparator 81 appears at angular velocity signal/self-diagnostic signal output terminal 68. Instead of this, the output of comparator 81 can be outputted solely.

In the above description of the present embodiment, in the self-diagnostic circuit, self-diagnostic signals are outputted from comparator 81, and also from first comparator 85 and second comparator 86. Instead of this, it is also possible to output a self-diagnostic signal from one of comparator 81, first comparator 85 and second comparator 86.

In the above description of the present embodiment, when second drive circuit 52 is activated, all of fifth electrode 16, sixth electrode 17, seventh electrode 18 and eighth electrode 19 are supplied with drive signals having the same phase. Besides this, there are other choices such as supplying the drive signal on one of the electrodes only.

In the above description of the present embodiment, the tuning fork vibrator is made of a non-piezoelectric material such as silicon; however, this is not the only material possible. It is possible to use diamond, fused quartz, alumina, GaAs, etc. It is also possible to use a piezoelectric material such as crystal, $LiTaO_3$ or $LiNbO_3$.

In the above description of the present embodiment, second drive circuit 52 supplies drive signals to fifth, sixth, seventh and eighth electrodes 16, 17, 18 and 19 so as to vibrate tuning fork vibrator 1 in the Z-axis direction, thereby performing self diagnosis.

Besides this example, it is also possible to perform self diagnosis including the presence or absence of abnormalities in the detection unit or the presence or absence of the disconnection of a wire or the like in the detection system in the following manner. A drive signal is applied on tenth electrode 22 on arm 2 so as to vibrate tuning fork vibrator 1 in the Z-axis direction, while monitoring the presence or absence of an electric charge from 12th electrode 25 based on the bending of arm 3 which resonates with the vibration.

In the above description of the present embodiment, the value generated from reference value generator 82 connected with comparator 81 is set to 100 mV, and the values generated from reference value generators 87 and 88 respectively connected with first comparator 85 and second comparator 86 are set to 2000 mV. However, these reference values can be set as desired as one of the specifications required by the system side or of the design choices of this sensor.

INDUSTRIAL APPLICABILITY

The angular velocity sensor of the present invention is useful as an angular velocity sensor capable of diagnosing abnormalities without having on a tuning fork vibrator special abnormality diagnostic signal input electrodes or reference potential ground electrodes to reduce errors in detecting angular velocity.

The invention claimed is:

1. An angular velocity sensor comprising:
   a tuning fork vibrator including at least two arms, and a base to connect the at least two arms;
   a drive unit which is provided on a main surface of an arm of the at least two arms of the tuning fork vibrator so as to excite the tuning fork vibrator in one of an X direction and a Z direction of the tuning fork vibrator;
   a detection unit which is provided on the main surface of the arm of the at least two arms of the tuning fork vibrator so as to detect bending of the tuning fork vibrator vibrating in the Z direction in response to incoming angular velocity;
   a first drive circuit which makes the drive unit excite the tuning fork vibrator in the X direction;
   a detection circuit which includes an amplifier for amplifying a signal from the detection unit and producing an angular velocity signal;
   a second drive circuit which applies a drive signal to the drive unit so as to make the drive unit excite the tuning fork vibrator in the Z direction; and
   a self-diagnostic circuit which compares an output of the amplifier with a reference value when the second drive circuit applies the drive signal to the drive unit, and which determines to be abnormal when a prescribed value cannot be obtained.

2. The angular velocity sensor according to claim 1, wherein at turn-on, the second drive circuit is first activated so that the self-diagnostic circuit can perform self diagnosis, and after a mode transition occurs, the first drive circuit is activated so that detection of angular velocity can be performed in a predetermined manner.

3. The angular velocity sensor according to claim 1, wherein after the first drive circuit is activated and detection of angular velocity is continued for a prescribed length of time, the second drive circuit is activated so that the self-diagnostic circuit can perform self diagnosis, and then, the first drive circuit is activated again so that the detection of angular velocity can be performed again.

4. The angular velocity sensor according to claim 1, wherein the second drive circuit is activated when the detector circuit detects that a car is at a speed of zero, and the self-diagnostic circuit performs self diagnosis.

5. The angular velocity sensor according to claim 1, wherein the tuning fork vibrator is made of a non-piezoelectric material, and
   the drive unit includes:
      a first, second, third and fourth electrodes which are formed separately from each other inside and outside a center line on the main surface of each of the at least two arms of the tuning fork vibrator;
      a first, second, third and fourth piezoelectric thin films which are respectively formed on the first, second, third and fourth electrodes; and
      a fifth, sixth, seventh and eighth electrodes which are respectively formed on the first, second, third and fourth piezoelectric thin films, the fifth, sixth, seventh and eighth electrodes being applied with drive signals of a same phase by the second drive circuit,
   the detection unit includes:
      a ninth electrode which is formed on the main surface of one of the at least two arms separately from the first and second electrodes;
      a fifth piezoelectric thin film which is formed on the ninth electrode;
      a tenth electrode which is formed on the fifth piezoelectric thin film;
      an eleventh electrode which is formed on the main surface of an other of the at least two arms separately from the third and fourth electrodes;
      a sixth piezoelectric thin film which is formed on the eleventh electrode; and
      a twelfth electrode which is formed on the sixth piezoelectric thin film, and
   the self-diagnostic circuit includes:
      a first amplifier which is connected with the tenth electrode;
      a second amplifier which is connected with the twelfth electrode;
      a differential amplifier which differentially amplifies an output of the first amplifier and an output of the second amplifier; and
      a comparator which compares an output of the differential amplifier with a reference value.

6. The angular velocity sensor according to claim 1, wherein the tuning fork vibrator is made of a non-piezoelectric material, and
   the drive unit includes:
      a first, second, third and fourth electrodes which are formed separately from each other inside and outside a center line on the main surface of each of the at least two arms of the tuning fork vibrator;
      a first, second, third and fourth piezoelectric thin films which are respectively formed on the first, second, third and fourth electrodes; and a fifth, sixth, seventh and eighth electrodes which are respectively formed on the first, second, third and fourth piezoelectric thin films, the fifth, sixth, seventh and eighth electrodes being applied with drive signals of a same phase by the second drive circuit, the detection unit includes:
- a ninth electrode which is formed on the main surface of one of the at least two arms separately from the first and second electrodes;
- a fifth piezoelectric thin film which is formed on the ninth electrode;
- a tenth electrode which is formed on the fifth piezoelectric thin film;
- an eleventh electrode which is formed on the main surface of an other of the at least two arms separately from the third and fourth electrodes;
- a sixth piezoelectric thin film which is formed on the eleventh electrode; and
- a twelfth electrode which is formed on the sixth piezoelectric thin film, and the self-diagnostic circuit includes:
- a first amplifier which is connected with the tenth electrode;
- a second amplifier which is connected with the twelfth electrode;
- a first comparator which compares an output of the first amplifier with a reference value; and
- a second comparator which compares an output of the second amplifier with a reference value.

7. The angular velocity sensor according to claim 6, wherein the self-diagnostic circuit further includes:
- a differential amplifier which receives the output of the first amplifier and the output of the second amplifier; and
- a comparator which compares an output of the differential amplifier with a reference value.

* * * * *